(12) United States Patent  
Barry et al.

(10) Patent No.: US 7,859,433 B2  
(45) Date of Patent: Dec. 28, 2010

(54) SYSTEM AND METHOD FOR PROVIDING AIRPORT FINANCIAL REPORTS

(75) Inventors: James Barry, Madison, CT (US); Ron Dunsky, Brooklyn, NY (US); Matthew Marcella, West Hempstead, NY (US)

(73) Assignee: PASSUR Aerospace, Inc., Stamford, CT (US)

( * ) Notice: Subject to any disclaimer, the term of this patent is extended or adjusted under 35 U.S.C. 154(b) by 709 days.

(21) Appl. No.: 11/590,412

(22) Filed: Oct. 31, 2006

(65) Prior Publication Data

US 2007/0120729 A1 May 31, 2007

Related U.S. Application Data

(60) Provisional application No. 60/731,688, filed on Oct. 31, 2005.

(51) Int. Cl.
*G08B 21/00* (2006.01)

(52) U.S. Cl. .................... 340/945; 701/16; 705/13; 705/34

(58) Field of Classification Search ......... 340/945–960; 701/3–16; 705/13, 34
See application file for complete search history.

(56) References Cited

U.S. PATENT DOCUMENTS

| 5,574,648 | A | 11/1996 | Pilley | |
|---|---|---|---|---|
| 6,631,384 | B1 | 10/2003 | Richman et al. | |
| 6,812,890 | B2 * | 11/2004 | Smith et al. | 342/454 |
| 7,248,219 | B2 * | 7/2007 | Smith et al. | 342/456 |
| 2002/0082769 | A1 * | 6/2002 | Church et al. | 701/120 |
| 2003/0200138 | A1 * | 10/2003 | Smith et al. | 705/13 |
| 2004/0243302 | A1 * | 12/2004 | Barry et al. | 701/204 |

* cited by examiner

*Primary Examiner*—Brent Swarthout  
(74) *Attorney, Agent, or Firm*—Fay Kaplun & Marcin, LLP

(57) ABSTRACT

A system and method for receiving a first set of data for a plurality of aircraft landings at an airport, receiving a second set of data corresponding to the plurality of aircraft landings at the airport, the second set of data being received from a passive radar data source and comparing the first set of data to the second set of data to generate rules for analyzing additional data received from the passive radar data source. Also, a system and method for receiving passive data for an aircraft, receiving actual data for the aircraft, comparing the passive data to the actual data based on a set of rules and assigning a confidence level to the passive data based on the comparison.

11 Claims, 4 Drawing Sheets

SYSTEM AND METHOD FOR PROVIDING AIRPORT FINANCIAL REPORTS

PRIORITY CLAIM/INCORPORATION BY REFERENCE

This application claims the benefit of U.S. Provisional Patent Application 60/731,688 filed on Oct. 31, 2005 and entitled "Airport Financial Reports" and is expressly incorporated herein, in its entirety, by reference.

BACKGROUND

Landing fees provide a critical source of revenue for airports. Airlines, or any aircraft operator, incur landing fees whenever a plane, or other aircraft, lands at an airport. Generally, fees are assessed according to landing reports generated by the airlines and submitted to airports. This self-reporting practice is used because most airports do not have their own, independent information with which to determine what airlines should be charged.

SUMMARY OF THE INVENTION

A method for receiving a first set of data for a plurality of aircraft landings at an airport, receiving a second set of data corresponding to the plurality of aircraft landings at the airport, the second set of data being received from a passive radar data source and comparing the first set of data to the second set of data to generate rules for analyzing additional data received from the passive radar data source.

A method for receiving passive data corresponding to an aircraft in a vicinity of an airport, comparing the passive data to a set of rules corresponding to characteristics of landing aircraft at the airport and determining whether the passive data corresponds to a landing of the aircraft at the airport.

A system having a data receiving arrangement to receive passive data corresponding to an aircraft in a vicinity of an airport, a rules database storing a set of rules corresponding to characteristics of landing aircraft at the airport and a data analyzing arrangement to compare the passive data to a the rules to determine whether the passive data corresponds to a landing of the aircraft at the airport.

A method for receiving passive data for an aircraft, receiving actual data for the aircraft, comparing the passive data to the actual data based on a set of rules and assigning a confidence level to the passive data based on the comparison.

DETAILED DESCRIPTION

Figure 1:
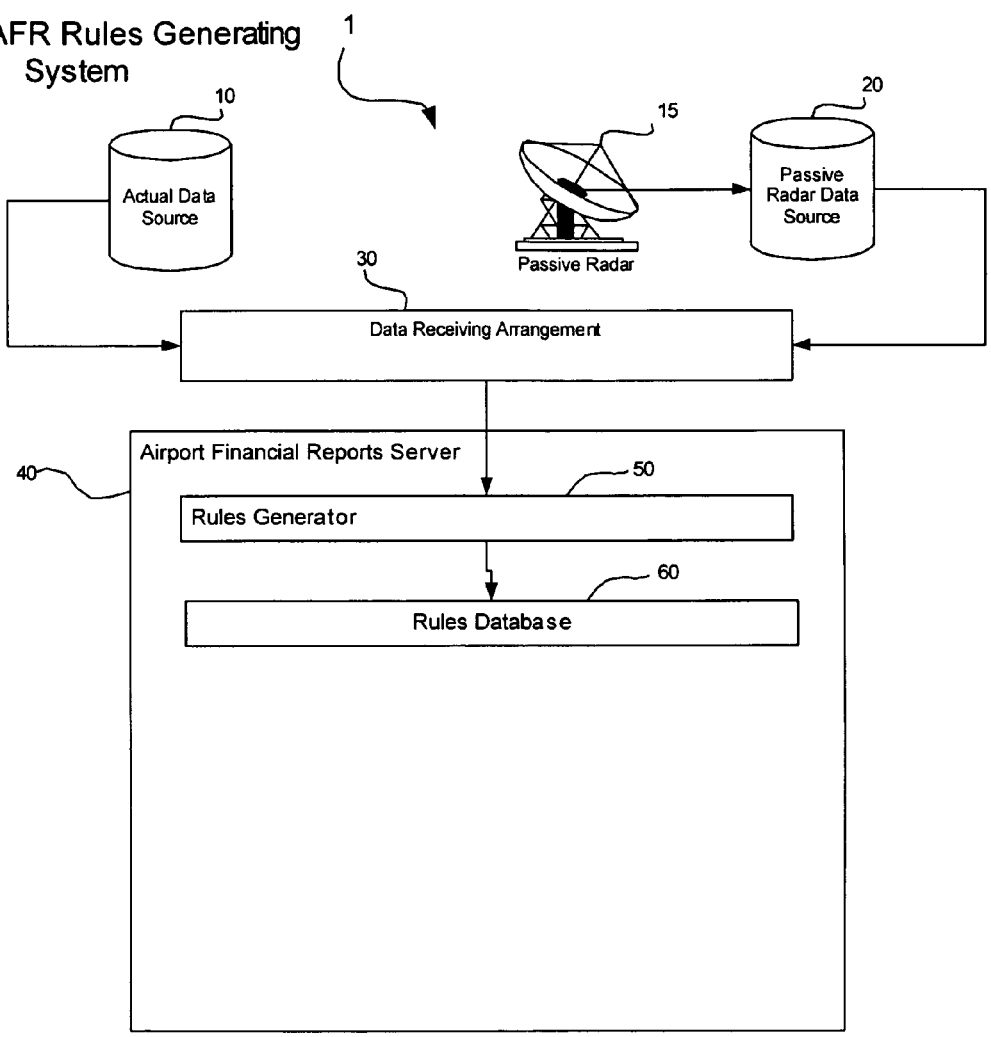
FIG. 1 shows an exemplary embodiment of a system for generating rules to provide airport financial reports according to the present invention.

The present invention may be further understood with reference to the following description and to the appended drawings, wherein like elements are referred to with the same reference numerals. The present invention provides for a system and method to provide airports with the information needed to bill airlines appropriately. The exemplary web-based system allows airports to either audit and reconcile landing fee "self-reports" or replace them with a program of proactive airport-generated landing fee billing. The goal of the exemplary embodiments is to have a more efficient, transparent, and standardized landing fee process, to the benefit of both carriers and airport operators.

Accordingly, the exemplary embodiment of the present invention is described as a system and method that utilizes data from a passive radar powered database and data reported by an airport to facilitate automatic tenant billing, reporting, and provide confidence levels that specific aircraft have landed at an airport. However, those skilled in the art will understand that there may be any number of other manners of implementing the present invention in embodiments that pertain to other data related to airport operations.

The exemplary system includes a passive secondary surveillance radar system. Passive radar, without emitting any active signals, receives aircraft identification and altitude information from aircraft transponder transmissions. These transmissions are interrogated by both existing secondary surveillance radars and the passive radar. With this information the system associated with the passive radar, generates its own data regarding aircraft movements within the vicinity of the airport.

Given the importance of landing fees for both carriers and airports, it is critical that any system provide consistently accurate information regarding which aircraft have landed at the airport. Paramount to having consistent, reliable information is the ability to validate and verify it. Therefore, in conjunction with providing billing and reporting functionality, the exemplary embodiments of the present invention seeks to increase the positive and negative predictive values of the information provided to airports. By increasing these values, the exemplary embodiments seek to make it more likely that a plane has actually landed when a passive radar powered system reports that it has landed.

FIG. 1 shows an exemplary system 1 for generating rules to provide airport financial reports. The system receives data from two sources: an actual data source 10 and a passive radar data source 20. The actual data source 10 is populated with data known to report actual events at an airport, for example, that aircraft X landed at time Y. The actual data that is provided may be any data that identifies or aids in identifying the actual aircraft that landed, for example, a time value, a flight number, a tail number, an airline, a runway, etc. This actual data may be provided in any manner such that it is known that the data provided is accurate. It is noted that all the data described herein is actual data in that it exists. However, the term "actual data" as used herein is referring to any data that is different from the passive data described below. That is, actual data may refer to data from any non-passive radar based source. Furthermore, the actual data is described below as being quality assured data that has a higher accuracy than the passive data to which it is being compared. Again, while it is preferred that the actual data used for developing the rules has a higher accuracy than the passive data, it is not necessary. That is, even if the actual data has a lower accuracy than the passive data, it is the comparison of the data (or a subset of the data) that will ensure a higher level of accuracy of the passive data or allow an accuracy value to be assigned to any particular set of passive data.

As will be described below, the purpose of providing this accurate data is to provide a baseline to which data from a passive radar system ("passive data") may be compared, thereby setting up a series of rules by which further passive data may be evaluated. As an example, the actual data source 10 may be a hand survey taken as planes land on a runway or runways at the airport, e.g., individuals record each flight that lands. Additional quality assurance measures may then be taken to ensure that the actual data is complete and correct. Those skilled in the art will understand that there may be other manners of getting accurate actual data without undertaking a hand survey and that the exemplary embodiments may be implemented with any of these manners.

Those skilled in the art will also understand that the amount of actual data that is collected should be a statistically significant amount such that patterns between the actual data and the passive data will emerge as the data is compared. In addition, it may be helpful to collect actual data when the airport is experiencing different operating conditions such as weekdays/weekends, clear/foggy/rainy weather, light/heavy traffic days, night/day, etc. The actual data may also include these conditions under which the actual data was collected.

The passive radar data source 20, provides data generated by a passive radar 15. The data generated by the passive radar system 20 should be substantially overlapping with the data provided by the actual source 10, e.g., a time value, a flight number, a tail number, an airline, a runway, etc. However, the data provided by the passive radar system 20 does not need to exactly match the data provided by the actual source 10. In addition, the passive radar system 20 may provide more or less data that the actual source 10. In the exemplary embodiment, the passive radar 15 is associated with a passive radar powered system in use by the airport facility, for example, the PASSUR® system sold by Megadata Corporation of Greenwich, Conn. However, those skilled in the art will understand the data may be supplied by any data source fed by a passive radar. In conjunction with actual data source 10 and passive radar data source 20, the present invention may also receive data from further data sources that will aid in the comparison of the actual data and the passive data. For example, instead of the actual data recording the weather conditions, a third data source from the National Weather Service may input the weather conditions at the time the data is collected.

The Airport Financial Reports server 40 accesses data sources 10 and 20 via the data receiving arrangement 30. The connection between the data receiving arrangement 30 and each of data sources 10 and 20 may be, for example, a one way socket connection providing a serial stream of data, e.g., the actual data and passive radar data regarding airport operations. The one way socket connection may be preferred to prevent users of the AFR system 1 from corrupting the data contained in data sources 10 and 20. However, there may be circumstances where a two way connection between the actual data source 10 or the passive radar data source 20 is desirable. The data receiving arrangement 30 may contain a database that is graphical, hierarchical, relational, or object-oriented. The database may be maintained on a local drive of the AFR server 40 or on a separate computer coupled to the server via a local area or other network (not shown).

The AFR server 40 may be, for example, a standard PC based server system running an operating system such as LINUX. Those skilled in the art will understand that any computing platform may be used for the AFR server 40. The data receiving arrangement 30 may transfer data to the AFR server 40 using any standard data format, for example, ASCII, text, XML, etc.

After receiving data from data receiving arrangement 30, the rules generator 50 will compare the actual data to the passive data and generate rules for analyzing additional passive data. For example, the rules generator 50 will analyze an actual landing that took place and the data associated with the actual landing, e.g., time, flight number, tail number, airline, runway, etc. The rules generator 50 will then analyze any corresponding passive data on that landing. Based on this comparison (and the comparisons of many actual data landings and passive data landings), the rules generator 50 will generate rules for analyzing the passive data for landings.

For example, based on a multitude of comparisons, it may be determined that when an aircraft is identified by the passive data using its Mode-S 24-bit address and a Unix time from the Mode S beacon and an altitude of zero based on passive techniques is derived, the passive radar system 20 data exactly matches the actual data from the actual data source 10. Thus, a rule may be generated that when these criteria are seen in the passive data, there is a 100% chance that the aircraft has actually landed.

In another example, it may be that when an aircraft meets the above criteria, except that the Mode-S 24-bit address cannot be converted to a valid tail number, the passive data only matches 98% of the time. Thus, a corresponding rule may be developed. In a further example, it may be that the passive radar develops a pattern of altitude for landing aircraft, e.g., the altitude decreases at a steady rate until it reaches zero. However, if a particular aircraft decreases at that rate, but does not reach zero, this may still be an indication that the aircraft has landed. It may be that the passive radar data never showed zero because a transponder was turned off prematurely, a building was blocking the signal from the aircraft, etc. Again, a corresponding rule may be set up to handle such situations and provide a probability that any particular aircraft exhibiting such characteristics has landed.

Those skilled in the art will understand that the above described rules are only exemplary and that the analyzing of the actual data and passive data may result in the generation of any number of rules. Furthermore, the rules that are generated may depend on an operating mode of the airport such as day/night/clear/low visibility, etc. Thus, different rules may be in effect for the same airport depending on the operating mode. Moreover, different airports or different installations of passive radar at the same airport may result in different rules because of physical characteristics of the passive radar, the location of the passive radar, the topography of the land, etc.

As these rules are developed, the rules generator 50 will store the rules in a rules database 60 in the AFR server 40. There is no requirement that generated rules be stored locally on the AFR server 40. In addition, the rules generator 50 does not need to be part of the AFR server 40. That is, the rules generator may be located at a different location, e.g., a vendor of the passive radar system 20, who may analyze the actual data and the passive data to generate the rules for the customer, e.g., the airport operator. Then the vendor may simply provide the generated rules to airport operator to analyze the further passive data collected at the airport. The analyzing of the further passive data will be described in greater detail below.

Figure 2:
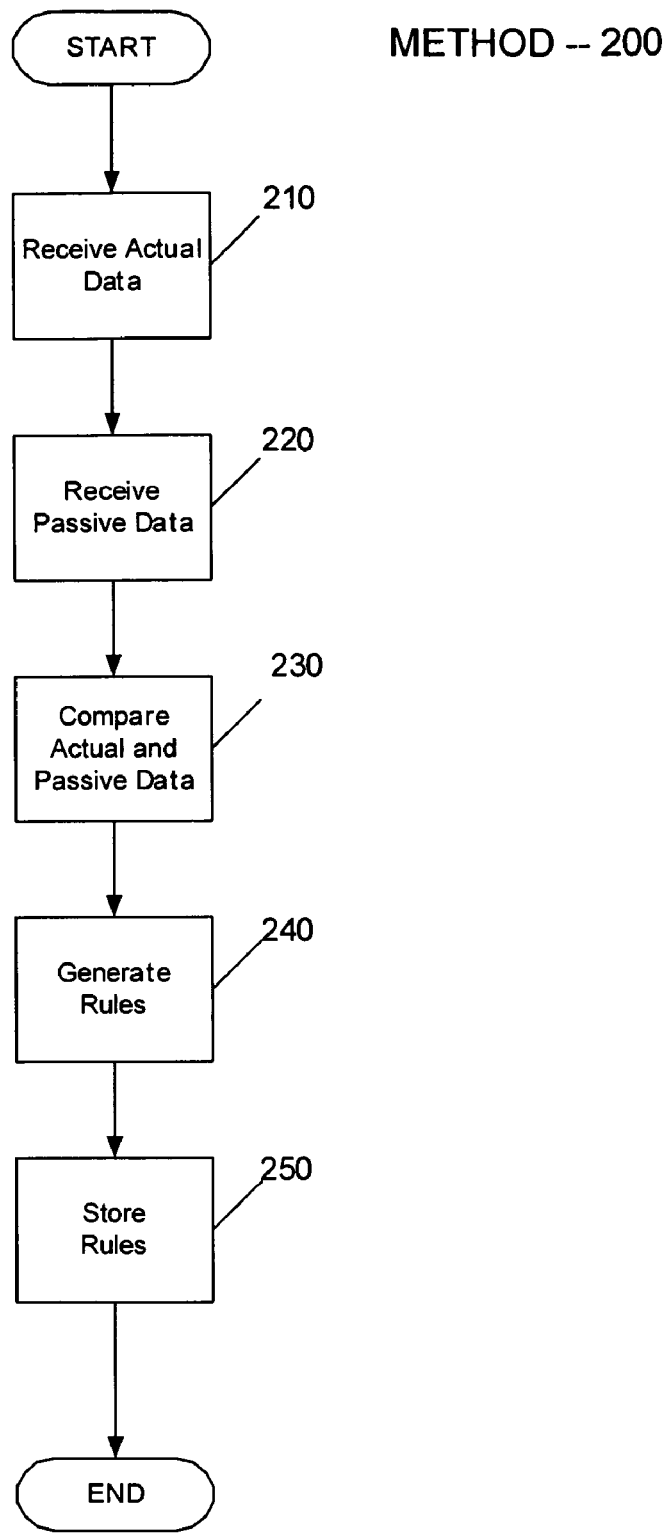
FIG. 2 shows an exemplary method for generating rules to provide airport financial reports according to the present invention.

FIG. 2 shows an exemplary method 200 for generating rules to provide airport financial reports. The method 200 will be described with reference to the exemplary components described in FIG. 1. The method 200 begins, as described above, with collecting data. In step 210 data that is known to be accurate is collected from the actual data source 10. In step 220 data from the passive radar data source 120 is collected. While not expressly stated above, it should be apparent that the actual data and the passive data used to generate the rules should be collected for the same time period.

In step 230, the actual data and the passive data is compared by the rules generator 50. The rules generator 50 then generates the rules for analyzing further passive data in step 240. The rules generator then stores these rules in rules database 60 for further use. The method 200 may be a one time method that is carried out to generate the rules or it may be carried out at various intervals, e.g., yearly, to verify that the generated rules remain valid.

Figure 3:
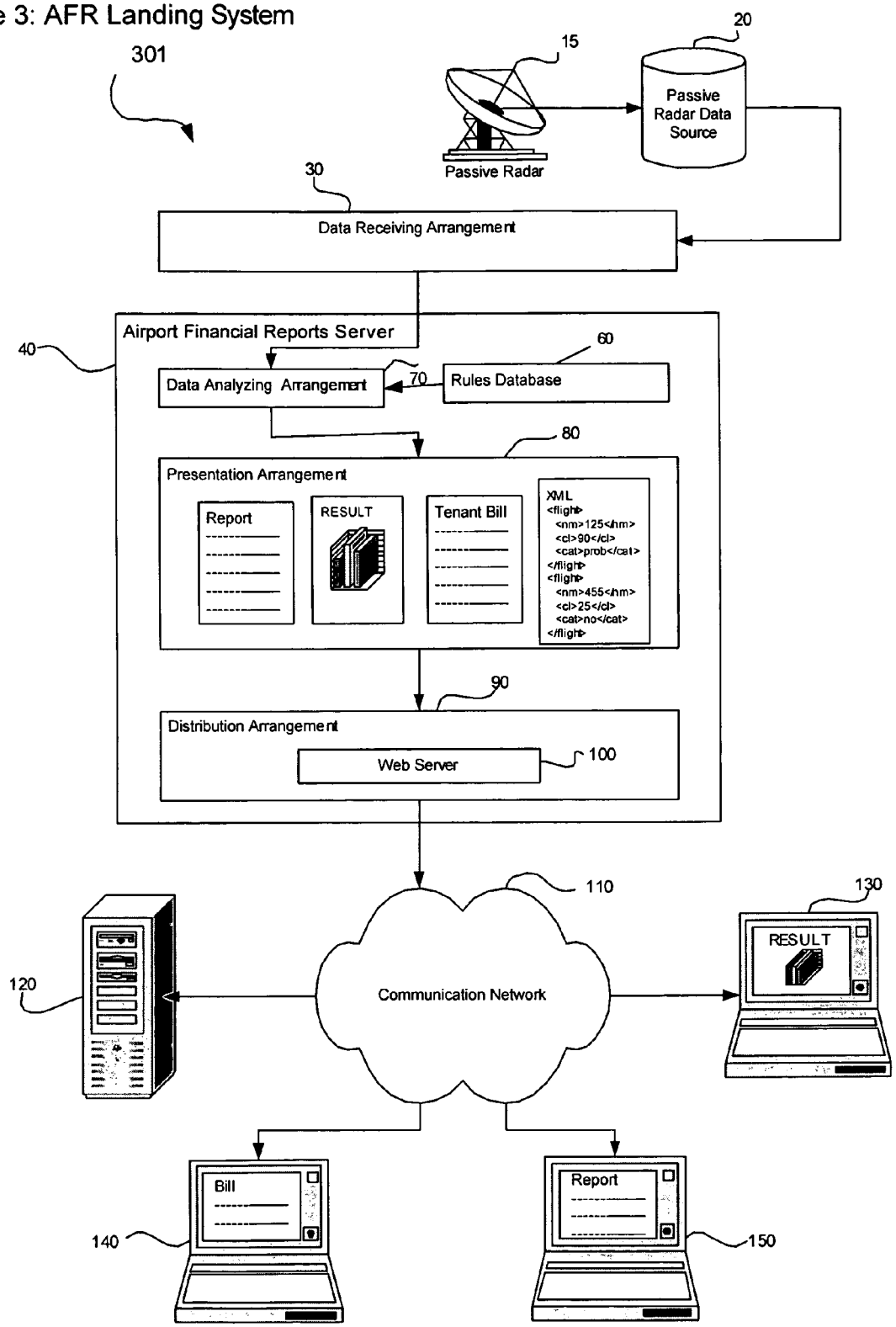
FIG. 3 shows an exemplary embodiment of a system for providing airport financial reports according to the present invention.

FIG. 3 shows a system 301 for the generation of airport financial reports based on the data input by the passive radar system 20. As can be seen, FIG. 3 includes some of the same components as FIG. 1, i.e., passive radar 15, passive data source 20, data receiving arrangement 30 and AFR server 40. The passive radar 15, passive data source 20 and the data receiving arrangement perform the same functions as described above, i.e., the collecting of passive data and transmitting the data to the AFR server 40. The difference between the system 1 of FIG. 1 and the system 301 of FIG. 3 is that there is no actual data source 10 that is input into the AFR server 40. As will be described in greater detail below, the goal of the exemplary embodiments of the present invention is to provide an airport with a high confidence level in the landing information provided by the passive radar data source 20, thereby allowing the airport to directly bill the owners that are landing at the airport or allowing the airport to double check the self reporting owners to verify that the owners are not underreporting their landings.

It should be understood by those skilled in the art that the collecting of the actual data used above to establish the rules is an expensive and time consuming process such that it could not be used on a daily basis to verify all landings at the airport. The actual data merely is used to establish a baseline (the rules) as to the trustworthiness of the data that is collected by the passive radar data source 20 for use in billing or verifying landings at the airport. The passive data source 20 is an automatic system that may be already collecting data at the airport. Thus, the exemplary embodiments may merely be adding additional functionality to the passive radar system, thereby making it a cost effective tool for performing the important landing verification task.

Accordingly, during operation of the airport, the passive radar source 20 is inputting passive data into the AFR server 40. The passive data includes at least that data which is indicative of a landing at the airport. This passive data is being received via the data receiving arrangement 30 at the data analyzing arrangement 70 of the AFR server 40. The data analyzing arrangement 70 compares the received passive data for an aircraft to the previously store rules concerning the passive data stored in rules database 60. Based on this comparison, the data analyzing arrangement assigns a confidence level that a particular aircraft has actually landed at the airport. Some exemplary rules were described above, but as stated, any number of rules may be applied to the passive data in order to evaluate whether the passive data indicates an actual landing.

The results of this comparison are provided from the data analyzing arrangement to the presentation arrangement 80 of the AFR server 40. The presentation arrangement 80 may then collate the results into a form that is desired by the user of the system 301. For example, a user may desire to generate a tenant bill for landing fees that may be sent to the owners of the aircraft, or a report showing the landings that the airport may use to compare to the self reporting of owners or for other airport operations. In addition, the presentation arrangement may present the results in a graphical manner or in other formats such as XML files, text files or HTML files, etc. for further dissemination of the results (discussed in more detail below).

The airport operator to determine the accuracy of passive radar data may also analyze the results. As described above, each rule that is developed may also include a confidence level that the passive data represents an actual landing at the airport. The confidence level reflects the level of certainty that the AFR server 40 has that a given event, in this case, that the passive radar data accurately reported the landing of a given aircraft. For example, in the statement "I can say with 95% certainty that aircraft X has landed," the confidence level is 95%. The comparison of the rules in the rules database 60 with the collected passive data by the data analyzing arrangement 70 will provide such results to the airport operator. The categorization of the confidence levels associated with the rules may include any categories that are useful to the airport operator. For example, the rules may place the confidence level for a particular landing in one of three categories: 'Definitely Landed,' 'Probably Landed,' or 'May have Landed.'

These results with the confidence levels will allow the airport operator to determine whether they are receiving the proper payments for landings at the airport. For example, if the landing report indicates that a particular owner has 100 landings in a month that are identified as 'Definitely Landed', but that owner only reported 90 landings, the airport operator may use this data to collect the extra fees from the owner or enter a dispute resolution to determine the discrepancy between the airport's data and the owner's data.

It should also be noted that when the AFR server 40 provides the results to the airport operator, the results may be indexed in any number of manners. An exemplary indexing that may be useful is by owner/operator and aircraft type. Thus, for billing purposes, the airport may be able to easily identify a number and type of each aircraft that the owner is landing at the airport in the reporting period (e.g., weekly, monthly, quarterly, etc.). This may be useful because the charges for each landing may be based on the aircraft type or weight that is determined by the aircraft type. However, those skilled in the art will understand that the airport may desire the reports or multiple reports indexed in any number of manners for evaluating different aspects of the operation of the airport. For example, an index merely by aircraft type and confidence level may be used to effectively estimate the number of passengers that arrived at the airport on a given day because the maximum capacity of each of the aircraft are generally known and estimates from the airline of capacity factors may be used. Again, the reports may be indexed in any number of manners so that useful information may be gathered from the reports.

The AFR server 40 may further include a distribution arrangement 90 for distributing the results generated by the AFR server 40 to interested parties. In this example, the distribution arrangement 90 includes a web server 100 to distribute the results. In an alternative embodiment, the distribution arrangement 90 may include an FTP server functionality to distribute results files to other systems or users via FTP protocols. Continuing with the example of FIG. 3, the web server 100 may host a web page or pages that displays the results file(s). The results may be password or other wise protected so that each user only has access to the results for which they are authorized. Thus, an exemplary user 130 that is an operations department of the airport may see the results in one manner that is useful to the user 130. A second user 150 may be in the billing department and may retrieve the results in a report file to verify a self report made by an owner. A third user 140 may be an owner that can retrieve their bill that has been generated by the AFR server 40. Finally, a system 120 may be included to provide a back-up of the results that are generated by the AFR server 40. Those skilled in the art will understand that the above users are only exemplary and that the results may be made to available to any number of users in any manner that the airport operator desires (e.g., paper reports, email, spreadsheets, etc.).

Figure 4:
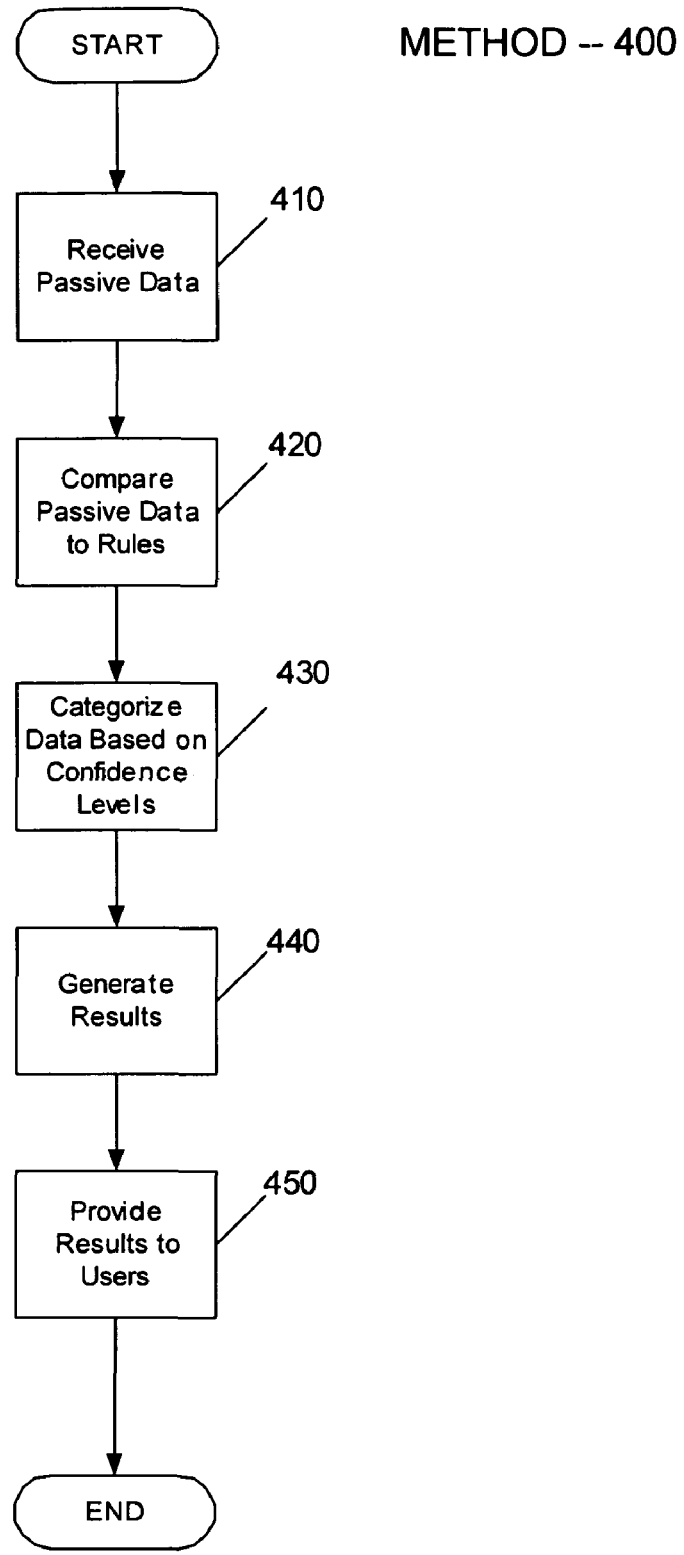
FIG. 4 shows an exemplary method for providing airport financial reports according to the present invention.

FIG. 4 shows an exemplary method 400 for providing airport financial reports. The method will be described with reference to the exemplary components of FIG. 3. In step 410, the AFR server receives the passive data that is generated by the passive radar 15 and the passive radar data source 20. This passive data is received by the data analyzing arrangement 70.

In step 420, the data analyzing arrangement 70 compares the passive data to the rules that have been previously generated and stored in the rules database 60. As described above, the comparison of the passive data to the rules will generate a confidence level that a particular aircraft has landed at the airport. These various confidence levels are evaluated and categorized as desired in step 430. In the above examples, the confidence levels were described as 'Definitely Landed,' 'Probably Landed,' or 'May have Landed.' Other classifications may also be used. For example, each landing may be numerically ranked into probability categories such as >99%, between 95 and 99%, lower than 80%, etc.

Based on these categories, the AFR server 40 may generate results showing each potential landing and the probability that the landing has occurred. As described above, these results may be collated into any number of reports and indexed in manners that are useful for their intended purposes. In addition, certain data may be left out of the reports. For example, a user may only desire to see those landings where the data is 99% certain that a landing has occurred. These results are then provided to the users in step 450.

In an alternative exemplary embodiment, the AFR server 40, during normal operation, may continue to receive both the passive data from the passive data source 20 and the actual data from the actual data source 10. In this exemplary embodiment, the rules that are stored in the rules database 60 may be rules that are not just for evaluating the incoming passive data based on a previous comparison of actual data to passive data as described above, but rather rules for a continuous comparison of incoming actual data with incoming passive data. For example, there may be a rule that states that a certain field (or fields) of actual data should be compared to corresponding field(s) of the passive data. Each match between the various field(s) of active and passive data my result in a predetermined accuracy or confidence value. Thus, after the complete comparison of the actual and passive data, a confidence level may then be assigned to the passive data.

Those skilled in the art will understand that the above was only an exemplary rule and that any type of rule that may be set up to compare passive data to actual data may be used. Thus, in this example, as the passive data is received it may be compared in real time to the actual data from one or more data sources and, using the rules, the accuracy of the passive data may be established. This exemplary embodiment may be especially effective when, as described above, the accuracy of the actual data may not be able to be verified. However, by comparing the passive data with the actual data whether once, or in a series of comparisons, using, for example, pattern recognition and overlapping correlations, the confidence level of the passive data may be determined. This confidence level for the passive data may then be used in the same manner as described above.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A server executing a set of instructions operable to:
    receive a first set of data for a plurality of aircraft landings at an airport;
    receive a second set of data corresponding to the plurality of aircraft landings at the airport, the second set of data being received from a passive radar data source; and
    compare the first set of data to the second set of data to generate rules for analyzing additional data received from the passive radar data source.

2. The server of claim 1, further operable to: store the rules.

3. The server of claim 1, wherein the rules include a probability level that the additional data corresponds to an actual landing of an aircraft.

4. The server of claim 1, wherein each of the first and second sets of data include one of a time value, a flight number, a tail number, an airline, a runway, an altitude, an x-position and a y-position.

5. The server of claim 1, further operable to: receive a third data set corresponding to an operating condition of the airport, wherein the rules are applicable to the operating condition identified by the third data set.

6. The server of claim 5, wherein the operating condition includes one of a time of day, a day of the week, a weather condition, an air traffic condition and an abnormal operating condition.

7. A system, comprising:
    a data receiving arrangement to receive passive data corresponding to an aircraft in a vicinity of an airport;
    a rules database storing a set of rules corresponding to characteristics of landing aircraft at the airport;
    a data analyzing arrangement to compare the passive data to a the rules to determine whether the passive data corresponds to a landing of the aircraft at the airport, wherein the data analyzing arrangement places a probability on the likelihood that the passive data corresponds to the landing of the aircraft; and
    a rules generator receiving a first set of data for a plurality of aircraft landings at the airport and a second set of data corresponding to the plurality of aircraft landings at the airport, the second set of data being received from a passive radar data source that generates the passive data, the rules generator comparing the first set of data to the second set of data to generate the rules corresponding to the characteristics of landing aircraft at the airport.

8. The system of claim 7, further comprising: a presentation arrangement for preparing results in a user readable form generated by the data analyzing arrangement.

9. The system of claim 7, wherein the data receiving arrangements receives the passive data for a plurality of aircraft in the vicinity of the airport and the data analyzing arrangement compares the passive data for each of the plurality of aircraft to determine if each of the passive data corresponds to a landing of each of the plurality of aircraft.

10. The system of claim 7, further comprising: a distribution arrangement to distribute the results of the determination made by the data analyzing arrangement.

11. The system of claim 10, wherein the distribution arrangement includes one of a web server and an FTP server.

* * * * *